US010554667B2

(12) United States Patent
Wang (10) Patent No.: US 10,554,667 B2
(45) Date of Patent: Feb. 4, 2020

(54) METHODS, APPARATUS, AND SYSTEMS FOR RESOURCE ACCESS PERMISSION MANAGEMENT

(71) Applicant: ALIBABA GROUP HOLDING LIMITED, George Town, Grand Cayman (KY)

(72) Inventor: Xiaodong Wang, Chengdu (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/002,120

(22) Filed: Jan. 20, 2016

(65) Prior Publication Data

US 2016/0219056 A1 Jul. 28, 2016

(30) Foreign Application Priority Data

Jan. 22, 2015 (CN) .......................... 2015 1 0031127

(51) Int. Cl.
*H04L 29/06* (2006.01)
(52) U.S. Cl.
CPC ................... *H04L 63/105* (2013.01)
(58) Field of Classification Search
CPC ........................ H04L 63/105; G06F 21/6209
USPC ....................................................... 726/4
See application file for complete search history.

(56) References Cited

U.S. PATENT DOCUMENTS

| 6,112,181 | A | 8/2000 | Shear et al. |
| 9,684,723 | B2 * | 6/2017 | Portnoy .............. G06F 17/3089 |
| 2002/0178271 | A1 | 11/2002 | Graham et al. |
| 2003/0065942 | A1 | 4/2003 | Lineman et al. |
| 2003/0069749 | A1 | 4/2003 | Shear et al. |
| 2003/0204753 | A1 | 10/2003 | Raley et al. |
| 2004/0003139 | A1 | 1/2004 | Cottrille et al. |
| 2004/0010602 | A1 | 1/2004 | Van Vleck et al. |
| 2005/0055570 | A1 | 3/2005 | Kwan et al. |
| 2006/0003796 | A1 | 1/2006 | Vireday et al. |
| 2006/0048224 | A1 | 3/2006 | Duncan et al. |
| 2007/0143825 | A1 | 6/2007 | Goffin |
| 2007/0282841 | A1 | 12/2007 | Sreedhar |
| 2008/0288330 | A1 | 11/2008 | Hildebrand et al. |
| 2010/0325697 | A1 | 12/2010 | Terzis et al. |
| 2011/0126281 | A1 * | 5/2011 | Ben-Zvi .............. G06F 21/6218 726/21 |

(Continued)

FOREIGN PATENT DOCUMENTS

| CN | 101090336 A | 12/2007 |
| CN | 101902402 A | 12/2010 |
| CN | 102904762 A | 1/2013 |

OTHER PUBLICATIONS

PCT International Search Report and Written Opinion dated Apr. 1, 2016, issued in corresponding International Application No. PCT/US2016/14120 (8 pages).

(Continued)

*Primary Examiner* — Anthony D Brown
(74) *Attorney, Agent, or Firm* — Finnegan, Henderson, Farabow, Garrett & Dunner, LLP (57) ABSTRACT

A resource permission management method is disclosed. The method includes monitoring, by a processor, a sensitivity of a target resource, and when the sensitivity of the target resource changes, adjusting, by the processor, a permission level of the target resource according to the sensitivity of the target resource.

17 Claims, 3 Drawing Sheets

(56) References Cited

U.S. PATENT DOCUMENTS

| | | | |
|---|---|---|---|
| 2014/0143837 A1* | 5/2014 | Fletcher | H04L 63/105 726/4 |
| 2014/0165167 A1 | 6/2014 | Nunn et al. | |
| 2014/0196103 A1 | 7/2014 | Chari et al. | |
| 2014/0215603 A1 | 7/2014 | Giblin et al. | |
| 2014/0230070 A1* | 8/2014 | Ramamurthy | G06F 21/554 726/26 |

OTHER PUBLICATIONS

SIPO First Chinese Office Action issued in Chinese Application No. 201510031127.4, dated Jul. 2, 2018, 15 pages.
Chinese Search Report issued by the State Intellectual Property Office of the People's Republic of China in counterpart Chinese Application No. 201510031127.4 dated Jun. 21, 2018 (2 pages).

* cited by examiner

METHODS, APPARATUS, AND SYSTEMS FOR RESOURCE ACCESS PERMISSION MANAGEMENT

CROSS REFERENCE TO RELATED APPLICATION

The present application is based on and claims the benefits of priority to Chinese Application No. 201510031127.4, filed Jan. 22, 2015, the entire contents of which are incorporated herein by reference.

TECHNICAL FIELD

The present application relates to resource access level controls, and more particularly, to methods, apparatus, and systems for resource access permission management.

BACKGROUND

Online resources open to public access are subjected to different risks such as identity theft. In response, service providers have implemented control methods to restrict the access. For resources containing less sensitive information, such as forum resources, access control is less strict; whereas for resources containing more sensitive information, such as ID numbers, member information and bank accounts, access control is more strict.

Different types of resources have different sensitivities associated with their values. For example, if bank accounts are leaked, it may cost monetary loss to account holders or banks, and thus such resources have a very high sensitivity. For another example, if users are allowed to freely access video and image resources in a server, hackers may attack the server for various purposes, which can be potentially disastrous to server operations. Thus, such resources have a high sensitivity. For yet another example, advertisement information and online forum information are public-oriented and usually do not involve confidentiality. They are resources with a low sensitivity.

Existing practices of defining access/permission level are usually static and cannot dynamically adjust the access levels, nor have the flexibility to respond to an evolving resource content. It is common that an administrator, in a stage of defining permission, artificially divides permission levels of the resources based on importance of content currently included in the resources, which is a static manner. This manner of dividing permission levels for the resources fails to take dynamic changes of the resources into account, if the content included in the resources changes, it may result in that the permission levels of the resources change, if such a change cannot be done timely, it is likely to result in improper access control. For example, suppose that, in the stage of defining permission, the administrator divides a resource into a higher permission level and forbids users to access the resource at will. As time goes on, the content included in the resource changes, resulting in that the resource can be accessed by most users. However, as the permission level of the resource is not altered, it results in that only a small number of users can access the resource, which limits utilization of the resource. For another example, suppose that, in the stage of defining permission, the administrator divides a resource into a lower permission level and allows most users to access the resource. As time goes on, the content included in the resource changes. At this point, it is necessary to forbid some users to access the resource at will. However, as the permission level of the resource is not altered, it results in that most users can still access the resource, thus causing potential safety hazards to the resource.

SUMMARY

One aspect of the present disclosure is directed to a resource permission management method. The method includes monitoring, by a processor, a sensitivity of a target resource; and when the sensitivity of the target resource changes, adjusting, by the processor, a permission level of the target resource according to the sensitivity of the target resource.

Another aspect of the present disclosure is directed to a resource permission management apparatus. The apparatus includes a monitoring module configured to monitor a sensitivity of a target resource; and an adjustment module configured to, when the sensitivity of the target resource changes, adjust a permission level of the target resource according to the sensitivity of the target resource.

Another aspect of the present disclosure is directed to a webpage resource permission management method. The method includes monitoring, by a web browser, a sensitivity of a webpage resource; and when the sensitivity of the webpage resource changes, adjusting, by a processor on a server, a permission level of the webpage resource according to the sensitivity of the webpage resource.

Another aspect of the present disclosure is directed to a webpage resource permission management apparatus. The method includes a monitoring module configured to monitor a sensitivity of a webpage resource; and an adjustment module configured to, when the sensitivity of the webpage resource changes, adjust a permission level of the webpage resource according to the sensitivity of the webpage resource.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
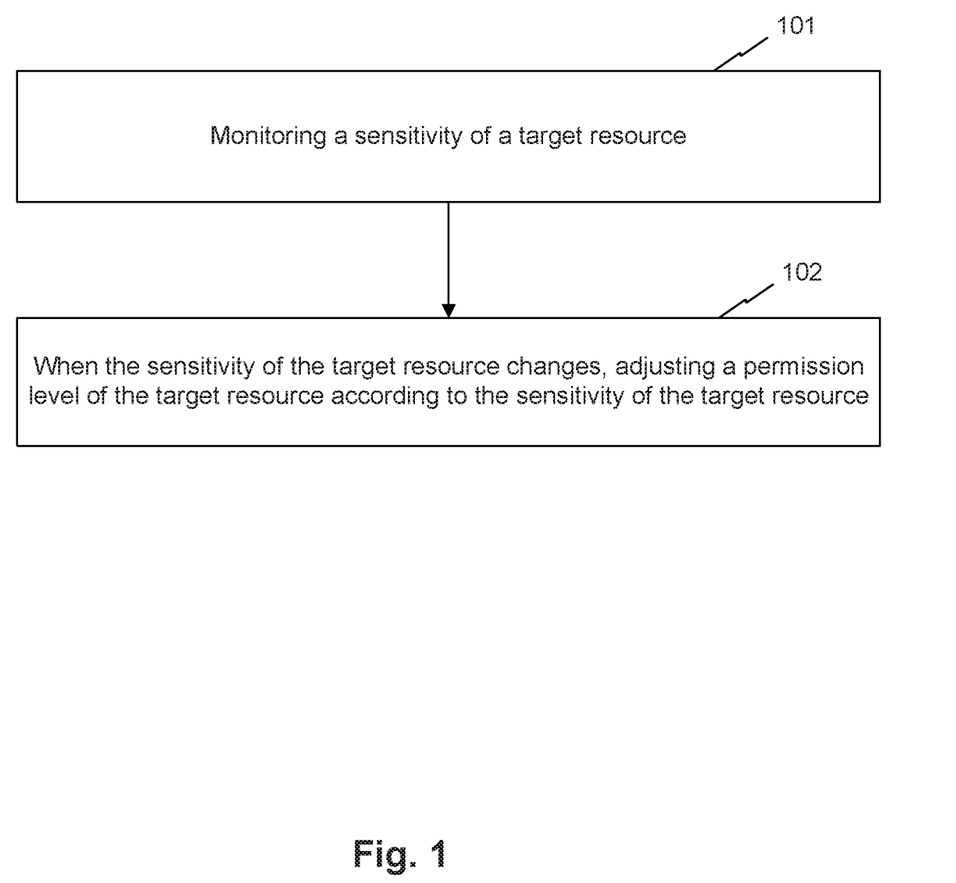
FIG. 1 is a flow diagram illustrating a resource access permission management method, according to an exemplary embodiment.

FIG. 1 is a flow diagram of an embodiment of a resource access permission management method 100. The method may include:

Step 101: monitoring a sensitivity of a target resource. The monitoring can be performed by a processor executing software codes stored on memories.

Step 102: when the sensitivity of the target resource changes, adjusting a permission level of the target resource according to the sensitivity of the target resource. The adjusting can be performed by the processor executing the software codes stored on the memories.

This example provides a resource access permission management method, which can be executed by a resource access permission management apparatus described below. In some embodiments, the resource access permission management apparatus is configured to manage permission levels of resources, so as to perform access control on the resources.

Service systems generally provide some sources for users to access or use. If service systems are different, it is likely that resources which the service systems can provide are also different. Generally, sensitivity of different resources is also different. For the resources with different sensitivity, it is necessary to perform access control in different degrees, so as to improve security of the resources while giving full play to advantages of the resources.

For instance, the service system can be an information management system inside an enterprise, and resources that can be provided mainly include some information type resources, for example, including employee information, enterprise information and the like. The employee information can include account names, correspondence addresses, mobile phone numbers, and ID numbers of employees, and the like; the enterprise information can include an address of the enterprise, a name of the enterprise, registered assets of the enterprise and an internal BBS opened by the enterprise for the employees, and the like.

For example, once the account names, the correspondence addresses, the mobile phone numbers, and the ID numbers of the employees, and the like are revealed, they can be easily illegally used by offenders, so as to cause inestimable losses to the employees and the enterprise. These resources are resources with higher sensitivity, and users are generally not allowed to access such resources at will. The address of the enterprise, the name of the enterprise, the registered assets of the enterprise and the internal BBS opened by the enterprise for the employees and the like are public-oriented, and thus do not involve confidentiality and are resources with lower sensitivity. For such resources, the more users that access or use them there are, the greater the value of the resources is, and thus, generally, most users are allowed to access the resources.

The service system can include a resource permission management apparatus, for example, a network resource management system. The resources that can be provided can include network resources, for example, advertisement information, BBS information, video resources, image resources, member information and the like. The member information and the like are normally categorized with higher sensitivity. If users are allowed to access the video resources and the image resources above mentioned at will, it is likely that some hackers may attack servers that provide the resources, and thus these resources may be categorized with higher sensitivity. For such resources with higher sensitivity, generally, users are not allowed to access them at will. The advertisement information, the BBS information and the like are public-oriented, and thus do not involve confidentiality and can be categorized with lower sensitivity. For such resources, the more users that access or use them there are, the greater the value of the resources is, and thus, generally, most users are allowed to access the resources.

In order to facilitate access control on the resources provided by the service system, the resource permission management apparatus can divide permission levels for the resources with different sensitivities. The resource permission management apparatus can also adjust a permission level of a resource timely, so as to facilitate access control on the resource. The resource permission management apparatus can monitor the sensitivity of a target resource, and when the sensitivity of the target resource changes, the resource permission management apparatus can adjust a permission level of the target resource according to the sensitivity of the target resource.

In some embodiments of the present disclosure, the resource permission management apparatus can periodically monitor a sensitivity of a target resource, and when it is found that sensitivity of the target resource in a current cycle is different from that in a previous cycle, adjust a permission level of the target resource according to the sensitivity of the target resource in the current cycle.

In one embodiment, the resource permission management apparatus can monitor a sensitivity of a target resource in real time, and when it is found that the sensitivity of the target resource changes, adjust a permission level of the target resource according to the sensitivity of the target resource.

The sensitivity of the target resource can be embodied through sensitive information included in the target resource. The sensitive information can be defined differently according to a different application scenario. The sensitive information referred to in this example is information which is generally recognized as having higher requirements for confidentiality in various application scenarios, for example, a user's account number, bank card number, mobile phone number and other similar information.

In some embodiments, the sensitivity of the target resource can be measured through a number of pieces of sensitive information included in the target resource. The resource permission management apparatus can monitor the number of the pieces of sensitive information included in the target resource, and determine the sensitivity of the target resource according to the number of the pieces of sensitive information included in the target resource. The higher the number of the pieces of sensitive information included in the target resource is, the higher the sensitivity of the target resource is; on the contrary, the lower the number of the pieces of sensitive information included in the target resource is, the lower the sensitivity of the target resource is.

Further, in some embodiments, the sensitivity of the target resource can be measured through a type of sensitive information included in the target resource. The resource permission management apparatus can monitor the type of the sensitive information included in the target resource, and determine the sensitivity of the target resource according to the type of the sensitive information included in the target resource. Different types of sensitive information have different requirements for confidentiality. The higher the requirements of the sensitive information included in the target resource for the confidentiality is, the higher the sensitivity of the target resource is; the lower the requirements of the sensitive information included in the target resource for the confidentiality is, the lower the sensitivity of the target resource is.

Further, in some embodiments, the sensitivity of the target resource can be measured through the number of pieces of sensitive information included in the target resource and/or a type of the sensitive information. The resource permission management apparatus can monitor the number of the pieces of sensitive information included in the target resource and the type of the sensitive information, and determine the sensitivity of the target resource according to the number of the pieces of sensitive information included in the target resource and the type of the sensitive information. The higher the number of the pieces of sensitive information included in the target resource is, the higher the requirements of the sensitive information for confidentiality is, then the higher the sensitivity of the target resource is; on the contrary, the lower the number of the pieces of sensitive information included in the target resource is, the lower the requirements of the sensitive information for confidentiality is, then the lower the sensitivity of the target resource is. For a situation where the same number of pieces of sensitive information is included, the higher the requirements of the sensitive information included for confidentiality is, then the higher the sensitivity of the target resource is. For a situation where the sensitive information included has the same requirement for confidentiality, the higher the number of the pieces of sensitive information included is, then the higher the sensitivity of the target resource is.

In one embodiment, the manner in which the resource permission management apparatus adjusts a permission level of a target resource according to the sensitivity of the target resource includes: determining a sensitivity level corresponding to the sensitivity of the target resource; and setting the permission level of the target resource to a permission level corresponding to the sensitivity level.

In some embodiments, after the resource permission management apparatus adjusts the permission level of the target resource, the resource permission management apparatus can notify an administrator, for example, by sending a notification message to the administrator in a manner such as a short message or an email, to remind the administrator that the permission level of the target resource changes and further verifying can be carried out.

In some embodiments, the sensitivity level and the permission level can be set according to an application scenario. Illustration is given below, as shown in Table 1, the sensitivity level can be determined according to the number of the pieces of sensitive information, but the sensitivity level is not limited to 1, 2 and 3, and the permission level is not limited to ordinary, important and confidential levels either. A user may use other sensitivity levels and permission levels.

TABLE 1

| Permission level | Sensitivity level | Number of pieces of sensitive information | Description |
|---|---|---|---|
| ordinary | 1 | 0 | Calculation is made with a weight value of each piece of sensitive information being 1. The sensitive information includes: ID numbers, mobile phone numbers, bank card numbers, emails, and the like. |
| important | 2 | 0-N; N is a natural number greater than 1 | |
| confidential | 3 | >N | |

In some embodiments, by monitoring sensitivity of a target resource, a permission level of the target resource is adjusted according to the sensitivity of the target resource when the sensitivity of the target resource changes. The present application can timely adjust the permission level of the target resource according to the change in the sensitivity of the target resource, in a dynamic manner. For example, when sensitivity of a resource becomes from lower to higher, the resource permission management apparatus can adjust the permission level of the resource from the original "ordinary" to "confidential," and the access control on the resource can be changed from the original "allow most of users to access" into "forbid users to access at will", or changed into "allow users at higher levels to access", or the access control can be strengthened in a manner of multi-level examination and approval and verifying, and so on, so as to ensure security of the resource and reduce a safety risk. For another example, when sensitivity of a resource becomes from higher to lower, the resource permission management apparatus can adjust the permission level of the resource from the original "confidential" to "ordinary", and the access control on the resource can be changed from the original "forbid users to access at will" into "allow most of users to access", or changed into "allow users at lower levels to access", or the access control can be loosened in a manner of a single-level examination and approval, and so on, so as to facilitate that the resource is fully used.

In one embodiment, the resource permission management apparatus, in addition to adjusting the permission level of the resource, can also be responsible for an access control process of the resource, so as to achieve access control on the resource. When a user needs to access the target resource, for example, through a terminal device, the terminal device can send a resource access request to the resource permission management apparatus. The resource access request generally carries user information and identification information of a resource to be accessed. The identification information of the resource to be accessed is used to identify a resource that the user makes a request for accessing, which mainly refers to the target resource in this example; the user information mainly includes identity, permission level, and other information of the user who makes a request for accessing the target resource. The resource permission management apparatus receives the resource access request sent by the terminal device; determines whether the user is an authorized user. That is, for example, determining whether the user is qualified to access the target resource; if the determination result is Yes, allowing the user to access the target resource; and if the determination result is No, refusing the user to access the target resource.

In one embodiment, the resource permission management apparatus can set an authorization code for the target resource, and sends the authorization code to the user who is qualified to access the target resource. Based on this, determining, by the resource permission management apparatus, whether the user who sends the resource access request is an authorized user can include: determining whether the resource access request includes the authorization code of the target resource; if the determination result is Yes, determining that the user is an authorized user; and if the determination result is No, determining that the user is not an authorized user.

In some embodiments, if the user is determined to be an authorized user, the resource permission management apparatus can send the target resource to the user, to allow the user to access the target resource; when the user is not determined to be an authorized user, the resource permission management apparatus refuses the user to access the target resource by not sending the target resource to the user.

In some other embodiments, if the user is determined to be an authorized user, the resource permission management apparatus can allow the user to log in to a device, e.g., a server, where the target resource is located, to allow the user to access the target resource; when the user is not determined to be an authorized user, the resource permission management apparatus forbids the user to log in to the device where the target resource is located, to refuse the user to access the target resource.

In one embodiment, a user can apply for the authorization code to access the target resource to the resource permission management apparatus. For example, a user can apply for the authorization code to the resource permission management apparatus after being refused to access the target resource by the resource permission management apparatus due to the absence of the authorization code; or a user can also previously apply for the authorization code to the resource permission management apparatus before applying for access to the target resource. When the user needs to apply for the authorization code of the target resource, the user can send an authorization request to the resource permission management apparatus, in which the authorization request can generally include user information and identification information of the target resource. The resource permission management apparatus receives the authorization request sent by the user, verifies the user according to the authorization request and the permission level of the target resource. The resource permission management apparatus can determine the target resource according to the identification information of the target resource in the authorization request, and then verify whether the user is qualified to access the target resource with the permission level according to the permission level of the target resource and the user information in the authorization request. If the user passes the verification, the resource permission management apparatus can send the authorization code of the target resource to the user, so that the user can access the target resource.

In one embodiment, the above target resource can be a webpage resource. Sensitivity of the webpage resource is monitored, when the sensitivity of the webpage resource changes, a permission level of the webpage resource is adjusted according to the sensitivity of the webpage resource, thereby achieving the purpose of timely adjusting the permission level of the webpage resource, so as to facilitate access control on the webpage resource.

In some embodiments, the resource permission management apparatus can be implemented by embedding software codes in a webpage browser. In some other embodiments, the resource permission management apparatus can be implemented in a distributed deployment manner. For example, a monitoring function is deployed at the browser, while a permission level adjustment function is deployed at a server side. An implementation flow of the distributed resource permission management apparatus is described below in detail.

A browser monitors sensitivity of a webpage resource and sends the sensitivity of the webpage resource to a server, and the server determines whether the sensitivity of the webpage resource changes and, when determining that the sensitivity of the webpage resource changes, adjusts a permission level of the webpage resource according to current sensitivity of the webpage resource.

In some embodiments, the browser can monitor the sensitivity of the webpage resource regularly. Alternatively, the browser can monitor the sensitivity of the webpage resource when rendering the webpage resource. For example, the user can click a URL of the webpage resource to send a resource access request, and the browser, when receiving the resource access request, renders the webpage resource and monitors the sensitivity of the webpage resource.

Further, in some embodiments, the browser, after receiving the resource access request sent by the user, determines whether the user who sends the resource access request is an authorized user. That is, for example, determining whether the user is qualified to access the webpage resource; if the determination result is Yes, returning the webpage resource to the user; and if the determination result is No, refusing to return the webpage resource to the user.

The foregoing exemplary methods are described as a series of combinations of steps so as to simplify the description. However, those skilled in the art should understand that the present application is not limited by a sequence of the combination of the steps described, because some steps can be performed in other sequences or at the same time in accordance with the present application.

In the foregoing examples, the description about each example has its own focus, and reference can be made to the related description of other examples for the part not detailed in a certain example.

Figure 2:
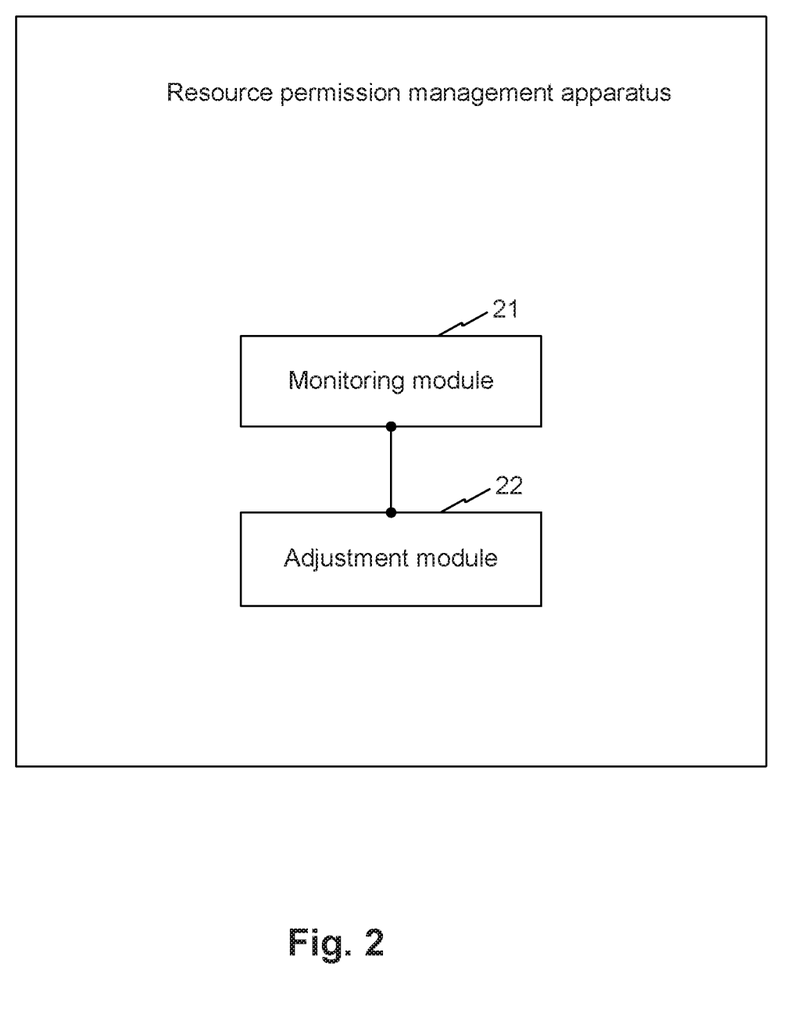
FIG. 2 is a block diagram illustrating a resource access permission management apparatus, according to an exemplary embodiment.

FIG. 2 is a schematic structural diagram of a resource permission management apparatus 200 provided as an example of the present application. As shown in FIG. 2, the apparatus includes a monitoring module 21 and an adjustment module 22. The monitoring module 21 and adjustment module 22 can be implemented by a processor executing software codes stored on memories.

The monitoring module 21 is configured to monitor a sensitivity of a target resource. The adjustment module 22 is configured to, when the monitoring module 21 monitors that the sensitivity of the target resource changes, adjust a permission level of the target resource according to the sensitivity of the target resource monitored by the monitoring module 21.

In some embodiments, the monitoring module 21 is configured to: periodically monitor the sensitivity of the target resource; or monitor the sensitivity of the target resource in real time.

In one embodiment, the monitoring module 21 is configured to monitor a number of pieces of sensitive information included in the target resource and/or a type of the sensitive information, and determine the sensitivity of the target resource according to the number of the pieces of sensitive information and/or the type of the sensitive information.

In one embodiment, the adjustment module 22 is configured to determine a sensitivity level which the sensitivity of the target resource is at when the sensitivity of the target resource changes, and adjust the permission level of the target resource to a permission level corresponding to the sensitivity level.

Figure 3:
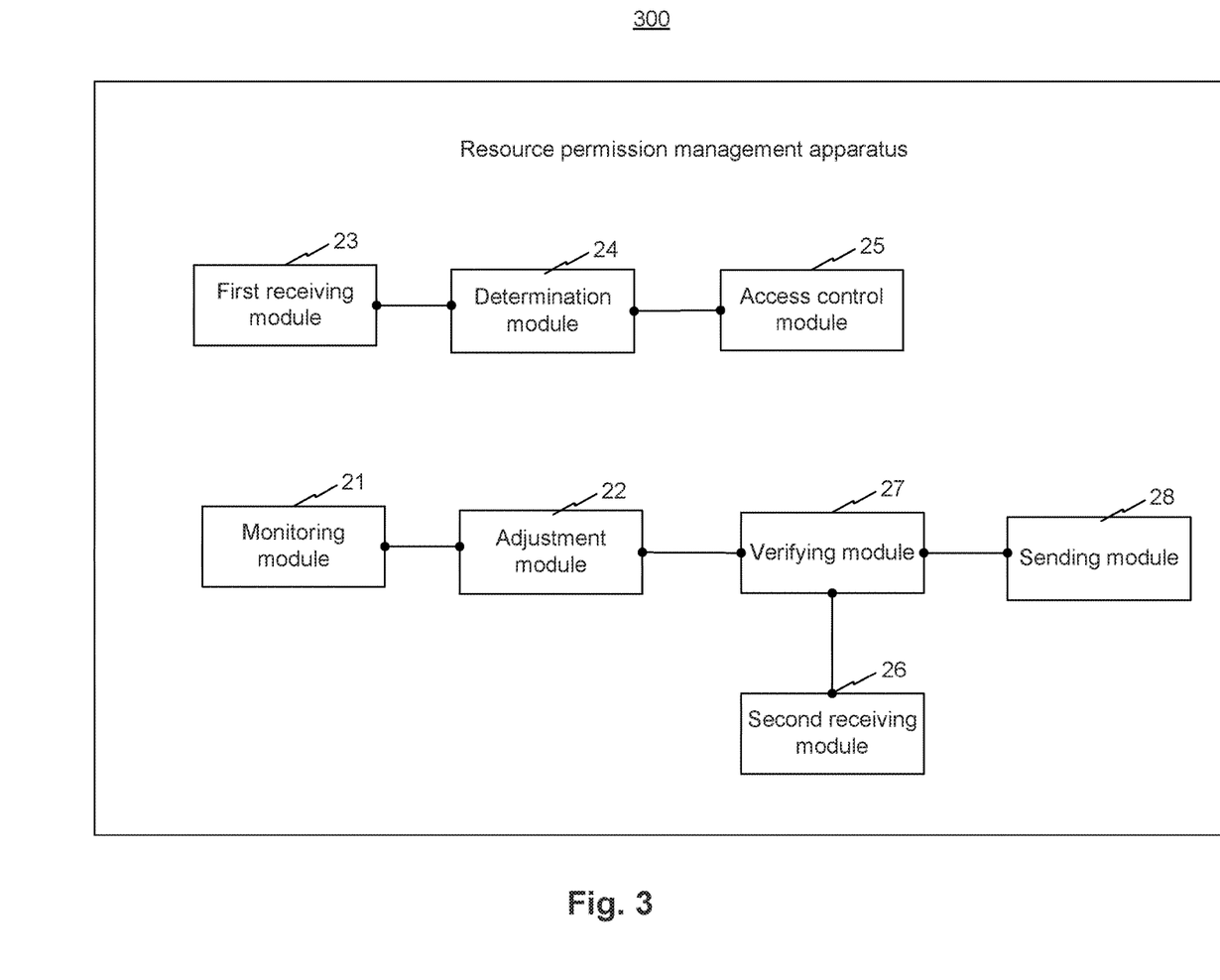
FIG. 3 is a block diagram illustrating a resource access permission management apparatus, according to another exemplary embodiment.

In one embodiment, as shown in FIG. 3, the resource permission management apparatus 300 further comprises: a first receiving module 23, a determination module 24 and an access control module 25. The first receiving module 23 is configured to receive a resource access request sent by a user terminal device. The determination module 24 is configured to determine whether the user is an authorized user. The access control module 25 is configured to, when the determination result of the determination module 24 is Yes, allow the user to access the target resource; and if the determination result of the determination module 24 is No, refuse the user to access the target resource. The first receiving module 23, determination module 24 and access control module 25 can be implemented by a processor executing software codes stored on memories.

In one embodiment, the determination module 24 is configured to determine whether the resource access request includes a permission code of the target resource. If the determination result is Yes, the determination module 24 determines that the user is an authorized user; and if the determination result is No, the determination module 24 determines that the user is not an authorized user.

In one embodiment, as shown in FIG. 3, the resource permission management apparatus further comprises a second receiving module 26, a verifying module 27, and a sending module 28. The second receiving module 26 is configured to receive an authorization request sent by the user terminal device. The verifying module 27 is configured to verify the user according to the authorization request received by the second receiving module 26 and the permission level of the target resource. The sending module 28 is configured to, when the user passes the verification, send the permission code of the target resource to the user. The second receiving module 26, verifying module 27, and sending module 28 can be implemented by a processor executing software codes stored on memories.

The resource permission management apparatus provided in this example, by monitoring sensitivity of a target resource, adjusts a permission level of the target resource according to the sensitivity of the target resource when the sensitivity of the target resource changes. The resource permission management apparatus provided in this example can timely adjust the permission level of the target resource according to the change in the sensitivity of the target resource in a dynamic manner.

The present disclosure also provides a webpage resource permission management apparatus, which may include a monitoring module and an adjustment module. The monitoring module is configured to monitor a sensitivity of a webpage resource. The adjustment module is configured to, when the sensitivity of the webpage resource changes, adjust a permission level of the webpage resource according to the sensitivity of the webpage resource monitored by the monitoring module.

The webpage resource permission management apparatus according to this example can be implemented by embedding software codes in a browser, or can also be implemented through distributed deployment, that is, for example, the monitoring module being deployed at a browser, and the adjustment module is deployed at a server.

The webpage resource permission management apparatus provided in this example can timely adjust the permission level of the webpage resource according to the change in the sensitivity of the webpage resource in a dynamic manner.

Those skilled in the art should understand that, reference can be made to the corresponding process in the foregoing method examples for the working procedures of the system, apparatus and modules described above, and will not be repeated herein in order to make the description convenient and concise.

In the several examples provided in the present application, it should be understood that the system, apparatus and method disclosed may be implemented in other manners. For example, the apparatus examples described above are only exemplary. For example, division of the modules/units is merely division of a logical function and a division in another manner may exist in actual implementation. For example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the apparatus or modules may be implemented electrically or in another form.

The modules/units described as separate parts may be or may not be physically separate, and parts displayed as modules/units may be or may not be physical modules/units, may be located in one position, or may be distributed on a plurality of network units. Some or all of the modules/units may be selected according to actual needs to achieve the objectives of the solutions of the examples.

In addition, each of functional modules/units in each of the examples of the present application may be integrated into one processing unit, or each of the modules/units may exist alone physically, or two or more of the above modules/units may be integrated into one processing unit. The modules/units may be logical modules implemented by software codes, or implemented in the form of hardware, or may be implemented in the form of hardware plus a software functional unit. For example, the modules/units may be implemented by a processor executing software instructions stored in computer readable memories.

The specification has described methods, apparatus, and systems for resource permission management. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks/modules have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It also should be noted that as used herein and in the appended claims, the phrases "by a processor/browser," and the like include partially or fully by a processor/browser, by a processor/browser in combination with other hardware and/or software, by one or more of processor/browser, and the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform the steps or stages or implement the modules consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A resource permission management method, comprising:
    periodically monitoring, by a processor, a sensitivity of a target resource; and
    when the sensitivity of the target resource has determined to be changed, adjusting, by the processor, a permission level of the target resource according to the sensitivity of the target resource;
    receiving a resource access request from a user terminal device;
    determining whether the resource access request includes an authorization code associated with the permission level of the target resource;
    determining that the user is not an authorized user in response to the resource access request being determined to not include the authorization code associated with the permission level of the target resource; and
    refusing the user access to the target resource in response to the user not being determined as an authorized user.

2. A resource permission management method, comprising:
    periodically monitoring, by a processor, a sensitivity of a target resource;
    when the sensitivity of the target resource has determined to be changed, adjusting, by the processor, a permission level of the target resource according to the sensitivity of the target resource;
    receiving a resource access request from a user terminal device;
    determining whether the resource access request includes an authorization code associated with the permission level of the target resource;
    determining that the user is an authorized user in response to the resource access request being determined to include the authorization code associated with the permission level of the target resource; and
    allowing the user access to the target resource in response to the user being determined as an authorized user.

3. The method of claim 1 or 2, wherein adjusting the permission level of the target resource according to the sensitivity of the target resource includes:
    determining a sensitivity level corresponding to the sensitivity of the target resource; and
    setting the permission level of the target resource to a permission level corresponding to the sensitivity level.

4. The method of claim 1 or 2, wherein monitoring the sensitivity includes:
    monitoring a number of pieces of sensitive information of the target resource and/or a type of the sensitive information; and
    determining the sensitivity of the target resource according to the number of pieces and/or the type of the sensitive information.

5. The method of claim 1 or 2, further comprising:
    receiving an authorization request from the user terminal device;
    verifying the user according to the authorization request and the permission level of the target resource; and
    sending the authorization code associated with the permission level of the target resource to the user in response to the user passing the verification.

6. A resource permission management apparatus, comprising:
    a monitoring module configured to periodically monitor a sensitivity of a target resource; and
    an adjustment module configured to, when the sensitivity of the target resource has determined to be changed, adjust a permission level of the target resource according to the sensitivity of the target resources;
    a first receiving module configured to receive a resource access request from a user terminal device;
    a determination module configured to:
        determine whether the resource access request includes n authorization code associated with the permission level of the target resource;
        if the resource access request is determined to include an authorization code associated with the permission level of the target resource, determine that the user is an authorized user; and
        if the resource access request is not determined to include an authorization code associated with the permission level of the target resource, determine that the user is not an authorized user; and
    an access control module configured to:
    if the user is determined to be an authorized user, allow the user access to the target resource; and
    if the user is not determined to be an authorized user, refuse the user access to the target resource.

7. The apparatus of claim 6, wherein the monitoring module is further configured to:
    monitor a number of pieces and/or a type of the sensitive information of the target resource; and
    determine the sensitivity of the target resource according to the number of pieces and/or the type of the sensitive information.

8. The apparatus of claim 6, wherein the adjustment module is further configured to:
    determine a sensitivity level corresponding to the sensitivity of the target resource; and set the permission level of the target resource to a permission level corresponding to the sensitivity level.

9. The apparatus of claim 6, further comprising:
a second receiving module configured to receive an authorization request from the user terminal device;
a verifying module configured to verify the user according to the authorization request and the permission level of the target resource; and
a sending module configured to, if the user passes the verification, send the authorization code associated with the permission level of the target resource to the user.

10. A webpage resource permission management method, comprising:
periodically monitoring a sensitivity of a webpage resource by a web browser on a terminal device; and
when the sensitivity of the webpage resource has determined to be changed, adjusting, by a server, a permission level of the webpage resource according to the sensitivity of the webpage resource;
receiving a webpage resource access request from a user terminal device;
determining whether the webpage resource access request includes an authorization code associated with the permission level of the target webpage resource;
determining the user as an authorized user in response to that the webpage resource access request is determined to include an authorization code associated with the permission level of the target webpage resource; and
allowing the user access to the target webpage resource in response to the user being determined as an authorized user.

11. A webpage resource permission management apparatus, comprising:
a monitoring module configured to periodically monitor a sensitivity of a webpage resource; and
an adjustment module configured to, when the sensitivity of the webpage resource has determined to be changed, adjust a permission level of the webpage resource according to the sensitivity of the webpage resource
a first receiving module configured to receive a webpage resource access request from a user terminal device;
a determination module configured to:
determine whether the webpage resource access request includes an authorization code associated with the permission level of the target webpage resource;
if the webpage resource access request is determined to include an authorization code associated with the permission level of the target webpage resource, determine that the user is an authorized user; and
if the webpage resource access request is not determined to include an authorization code associated with the permission level of the target webpage resource, determine that the user is not an authorized user; and
an access control module configured to:
if the user is determined to be an authorized user, allow the user access to the target webpage resource; and
if the user is not determined to be an authorized user, refuse the user access to the target webpage resource.

12. A non-transitory computer readable medium that stores a set of instructions that is executable by at least one processor of a resource permission management apparatus to cause the resource permission management apparatus to perform a method for resource permission management, the method comprising:
periodically monitoring sensitivity of a target resource; and
adjusting permission level of the target resource according to the sensitivity of the target resource in response to the sensitivity of the target resource has determined to be changed;
receiving a resource access request from a user terminal device;
determining whether the resource access request includes an authorization code associated with the permission level of the target resource;
determining that the user is an authorized user in response to that the resource access request being determined to include an authorization code associated with the permission level of the target resource;
determining that the user is not an authorized user in response to that the resource access request being determined not to include an authorization code associated with the permission level of the target resource;
allowing the user access to the target resource in response to the user being determined as an authorized user; and
refusing the user access to the target resource in response to the user not being determined as an authorized user.

13. A non-transitory computer readable medium of claim 12, monitoring the sensitivity of a target resource includes:
monitoring number of pieces and type of the sensitive information of the target resource; and
determining the sensitivity of the target resource according to the number of pieces and the type of the sensitive information.

14. The non-transitory computer readable medium of claim 12, wherein adjusting the permission level of the target resource according to the sensitivity of the target resource includes:
determining a sensitivity level corresponding to the sensitivity of the target resource; and
setting the permission level of the target resource to a permission level corresponding to the sensitivity level.

15. The non-transitory computer readable medium of claim 12, wherein the set of instructions that is executable by the at least one processor of the resource permission management apparatus to cause the resource permission management apparatus to further perform:
receiving an authorization request from the user terminal device;
verifying the user according to the authorization request and the permission level of the target resource; and
sending the authorization code associated with the permission level of the target resource to the user in response to the user passing the verification.

16. A non-transitory computer readable medium that stores a set of instructions that is executable by at least one processor of a server to cause the server to perform a method comprising:
monitoring a sensitivity of a webpage resource by a web browser on a terminal device in a cyclic manner; and
when the sensitivity of the webpage resource has determined to be changed, adjusting a permission level of the webpage resource according to the sensitivity of the webpage resource;
receiving a webpage resource access request from a user terminal device;
determining whether the webpage resource access request includes an authorization code associated with the permission level of the target webpage resource;
determining that the user is an authorized user in response to that the webpage resource access request is determined to include an authorization code associated with the permission level of the target webpage resource;

determining that the user is not an authorized user in response to that the webpage resource access request is determined not to include an authorization code associated with the permission level of the target webpage resource;

allowing the user access to the target webpage resource in response to the user being determined as an authorized user; and refusing the user access to the target webpage resource in response to the user not being determined as an authorized user.

17. The resource management method of claim 4, wherein determining the sensitivity of the target resource includes adjusting a permission level associated with the target resource based on the number of pieces of sensitive information in the target resource.

* * * * *

UNITED STATES PATENT AND TRADEMARK OFFICE
CERTIFICATE OF CORRECTION

PATENT NO. : 10,554,667 B2
APPLICATION NO. : 15/002120
DATED : February 4, 2020
INVENTOR(S) : Xiaodong Wang It is certified that error appears in the above-identified patent and that said Letters Patent is hereby corrected as shown below:

In the Claims

In Claim 1, Column 11, Line 40, "has determined" should read --has been determined--.

In Claim 2, Column 11, Line 59, "has determined" should read --has been determined--.

In Claim 6, Column 12, Line 35, "has determined" should read --has been determined--.

In Claim 6, Column 12, Line 37, "resources;" should read --resource;--.

In Claim 6, Column 12, Line 42, "n authorization code" should read --an authorization code--.

In Claim 10, Column 13, Lines 17-18, "has determined" should read --has been determined--.

In Claim 10, Column 13, Lines 26-27, "determining the user as an authorized user in response to that the webpage resource access request is determined" should read --determining that the user is an authorized user in response to the webpage resource access request being determined--.

In Claim 11, Column 13, Line 38, "has determined" should read --has been determined--.

In Claim 12, Column 14, Line 5, "has determined" should read --that has been determined--.

In Claim 12, Column 14, Lines 12-13, "in response to that the resource access request" should read --in response to the resource access request--.

In Claim 12, Column 14, Lines 16-17, "in response to that the resource access request" should read --in response to the resource access request--.

In Claim 16, Column 14, Lines 57-58, "has determined" should read --has been determined--.

Signed and Sealed this
Eighth Day of July, 2025

Coke Morgan Stewart
*Acting Director of the United States Patent and Trademark Office*

CERTIFICATE OF CORRECTION (continued)
U.S. Pat. No. 10,554,667 B2

In Claim 16, Column 14, Line 66 to Column 15, Line 1, "in response to that the webpage resource access request is determined" should read --in response to the webpage resource access request being determined--.

In Claim 16, Column 15, Lines 3-5, "in response to that the webpage resource access request is determined" should read --in response to the webpage resource access request being determined--.